(12) United States Patent
Gaudlip

(10) Patent No.: US 10,108,465 B1
(45) Date of Patent: Oct. 23, 2018

(54) AUTOMATED CLOUD SERVICE EVALUATION AND WORKLOAD MIGRATION UTILIZING STANDARDIZED VIRTUAL SERVICE UNITS

(71) Applicant: EMC Corporation, Hopkinton, MA (US)

(72) Inventor: Christopher J. Gaudlip, Plano, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 155 days.

(21) Appl. No.: 15/191,039

(22) Filed: Jun. 23, 2016

(51) Int. Cl.
*G06F 9/50* (2006.01)
*G06F 9/455* (2018.01)

(52) U.S. Cl.
CPC ........ *G06F 9/5088* (2013.01); *G06F 9/45558* (2013.01); *G06F 9/5077* (2013.01); *G06F 2009/4557* (2013.01); *G06F 2009/45595* (2013.01)

(58) Field of Classification Search
CPC .. G06F 9/5088; G06F 9/45558; G06F 9/5077; G06F 2009/4557; G06F 2009/45595
See application file for complete search history.

(56) References Cited

U.S. PATENT DOCUMENTS

| | | |
|---|---|---|
| 8,782,795 B1 | 7/2014 | Field et al. |
| 9,356,961 B1 | 5/2016 | Todd et al. |
| 2007/0088703 A1 | 4/2007 | Kasiolas et al. |
| 2009/0125432 A1 | 5/2009 | Deshpande et al. |
| 2011/0016214 A1* | 1/2011 | Jackson ............... G06F 9/5044 709/226 |
| 2012/0284410 A1 | 11/2012 | Dudek et al. |
| 2014/0258519 A1 | 9/2014 | Liu |

(Continued)

FOREIGN PATENT DOCUMENTS

CN 102387049 A 3/2012

OTHER PUBLICATIONS

V. Andrikopoulos, Z. Song, and F. Leymann, "Supporting the Migration of Applications to the Cloud through a Decision Support System," in Proceedings of the IEEE Sixth International Conference on Cloud Computing, 2013, pp. 565-572. (Year: 2013).*

(Continued)

*Primary Examiner* — Jacob D Dascomb
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement virtual resources of at least a first cloud-based system. The processing platform further comprises a cloud service evaluation module configured to assign a value to a given cloud service provided by the first cloud-based system in terms of a virtual service unit standardized for use across multiple cloud-based systems of different types, and a workload deployment module configured to control migration of a workload associated with the cloud service from the first cloud-based system to a second cloud-based system based at least in part on the assigned value.

20 Claims, 12 Drawing Sheets

(56) References Cited

U.S. PATENT DOCUMENTS

2015/0302304 A1 10/2015 Monden et al.
2016/0127407 A1 5/2016 Mankovskii et al.

OTHER PUBLICATIONS

XSTREAM, "The Key to Efficient Cloud Resource Management," The Virtustream μVM, www.virtustream.com, Jun. 17, 2016, 2 pages.

U.S. Appl. No. 14/870,899, filed in the name of Christopher Gaudlip on Sep. 30, 2015 and entitled "Workload Capsule Generation and Processing.".

* cited by examiner

AUTOMATED CLOUD SERVICE EVALUATION AND WORKLOAD MIGRATION UTILIZING STANDARDIZED VIRTUAL SERVICE UNITS

FIELD

The field relates generally to information processing systems, and more particularly to techniques for providing cloud services implemented using virtual resources in information processing systems.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Despite the widespread availability of these and numerous other private, public and hybrid cloud offerings, there exists a significant problem in conventional practice in that there is no adequate mechanism available for accurately comparing cloud services in a standardized manner across multiple distinct cloud service providers.

SUMMARY

Illustrative embodiments of the present invention provide information processing systems configured with automated cloud service evaluation functionality based on what are referred to herein as "virtual service units" or VSUs. These embodiments utilize such automated cloud service evaluation functionality to migrate workloads between multiple clouds including private, public and hybrid clouds. Other embodiments can perform additional or alternative actions based at least in part on automated cloud service evaluation utilizing virtual service units. These and other arrangements disclosed herein provide a particularly accurate and efficient mechanism for comparing distinct cloud service offerings and adjusting deployment of workloads across multiple clouds of different types.

In one embodiment, an apparatus comprises a processing platform that includes a plurality of processing devices each comprising a processor coupled to a memory. The processing platform is configured to implement virtual resources of at least a first cloud-based system. The processing platform further comprises a cloud service evaluation module configured to assign a value to a given cloud service provided by the first cloud-based system in terms of a virtual service unit standardized for use across multiple cloud-based systems of different types, and a workload deployment module configured to control migration of a workload associated with the cloud service from the first cloud-based system to a second cloud-based system based at least in part on the assigned value.

Illustrative embodiments can provide significant advantages relative to conventional cloud service evaluation and workload deployment and migration arrangements. For example, challenges associated with evaluation of cloud services implemented on different clouds are overcome through the use of standardized virtual service units. Such automated evaluation facilitates efficient deployment and migration of workloads across multiple distinct private, public or hybrid clouds, providing substantial cost and performance advantages for users.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
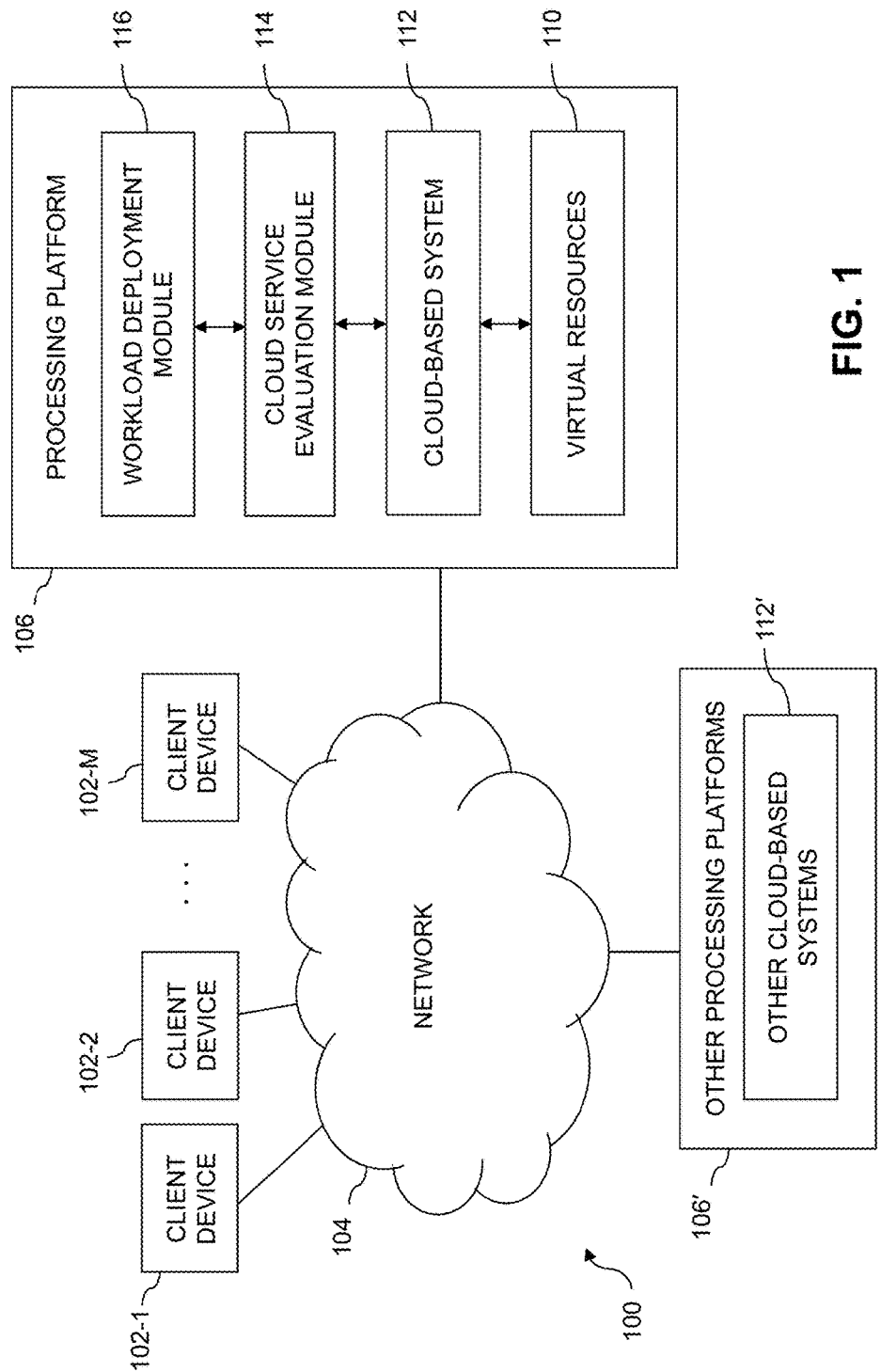
FIG. 1 is a block diagram of an information processing system configured with automated cloud service evaluation and workload migration in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise a plurality of containers allocable to respective client applications under the control of the cloud-based system 112. Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

By way of example, the processing platform 106 can be implemented at least in part utilizing converged infrastructure. Such converged infrastructure may comprise at least portions of VxRail™, VxRack™ or Vblock® converged infrastructure commercially available from VCE, the Virtual Computing Environment Company, an EMC Federation Company of the EMC Corporation of Hopkinton, Mass.

The processing platform 106 further comprises a cloud service evaluation module 114 and a workload deployment module 116, both associated with the cloud-based system 112. The cloud-based system 112 is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The cloud service evaluation module 114 is configured to assign a value to a given cloud service provided by the cloud-based system 112 in terms of a virtual service unit or VSU standardized for use across multiple cloud-based systems of different types. The workload deployment module 116 is configured to control migration of a workload associated with the cloud service from the cloud-based system 112 to a different cloud-based system based at least in part on the assigned value.

For example, in some embodiments, the different cloud-based system comprises another cloud-based system implemented with cloud-based system 112 on the processing platform 106. Alternatively, the different cloud-based system can comprise another cloud-based system 112' implemented on a different processing platform 106' coupled to the network 104. The cloud-based system 112 and the different cloud-based system to which a workload is migrated under the control of the workload deployment module 116 are also referred to herein as respective first and second cloud-based systems.

The workload deployment module 116 can provide a wide variety of different types of migration between different types of clouds within the system 100.

As one example, the workload deployment module 116 can control migration of the workload between an on-premises private cloud and at least one of an off-premises private cloud and an off-premises public cloud.

As another example, the workload deployment module 116 can control migration of the workload from an off-premises private cloud and at least one of an on-premises private cloud and an off-premises public cloud.

As yet another example, the workload deployment module 116 can control migration of the workload from an off-premises public cloud and at least one of an on-premises private cloud and an off-premises private cloud.

These examples will be further described below in conjunction with the respective embodiments of FIGS. 4A, 4B and 4C.

The value assigned to the cloud service by the cloud service evaluation module 114 illustratively comprises a particular number of virtual service units or VSUs.

In some embodiments, first and second cloud-based systems utilize different types of agreements or other contracts to characterize costs associated with provision of the cloud service within those systems. The value assigned to the cloud service advantageously allows the cost associated with provision of the cloud service in the first cloud-based system to be compared against a corresponding assigned value indicative of the cost associated with provision of the cloud service in the second cloud-based system. Such an arrangement allows workloads to be more easily migrated between different types of clouds.

The cloud service evaluation module 114 in some embodiments is configured to assign the value to the cloud service provided by the first cloud-based system utilizing a plurality of conversion operations that generally involve converting particular designated characteristics or other features of the cloud service into respective corresponding numbers of VSUs. For example, cloud service features such as the number and type of service tickets generated within the cloud service, the number and type of virtual machines of the cloud service, the number and type of storage resources of the cloud service, the number and type of sites of the cloud service, the number and type of project hours of the cloud service, the premises type of the cloud service, the number and type of public instances of the cloud service, the number and type of network resources, and the number and type of Internet devices of the cloud service, can each be converted into a corresponding number of VSUs. More detailed examples of the conversions of these cloud service features into corresponding numbers of VSUs will be provided below in conjunction with the description of FIG. 5.

It is to be appreciated that the particular characteristics and other features mentioned above are examples only, and should not be construed as limiting in any way. Additional or alternative types of characteristics or other features of a given cloud service can be converted into respective numbers of VSUs in other embodiments.

The cloud service evaluation module 114 is illustratively further configured to aggregate the various numbers of VSUs resulting from respective ones of the converting operations described previously, in conjunction with assigning the value to the cloud service provided by the first cloud-based system 112. In this manner, an aggregate number of VSUs is determined and assigned as the value to the given cloud service.

By way of example, the cloud service evaluation module 114 can illustratively comprise a conversion unit configured to determine numbers of VSUs associated with respective features of the cloud service, a parser and aggregator configured to combine the numbers of VSUs determined by the conversion unit, and a deduplication engine configured to remove any duplicative instances of the numbers of VSUs from the combined numbers of VSUs. An arrangement of this type will be described in more detail below in conjunction with the embodiment of FIG. 3. The cloud service evaluation module 114 may further comprise one or more additional sets of instances of the conversion unit, the parser and aggregator and the deduplication engine for respective ones of one or more additional projects associated with the cloud service.

The cloud service evaluation module 114 in some embodiments may further comprise a multi-cloud aggregation unit configured to receive total numbers of VSUs from each of a plurality of cloud-based systems and to combine those total numbers into a multi-cloud value in terms of VSUs.

Each of a plurality of additional cloud services of the cloud-based system 112 can be evaluated by the cloud service evaluation module 114 in a manner similar to that described above. The particular features or characteristics utilized in evaluating a given cloud service can be selected based at least in part on input provided by a corresponding client or other user. For example, certain features or characteristics that are highly desirable to one user may not be important to another user. However, the conversion of selected features or characteristics into particular numbers of VSUs allows the subjective value of the cloud service to a given user to be compared in an accurate and reliable way across multiple cloud-based systems of different types. As mentioned previously, the VSU is standardized for use across such multiple cloud-based systems of different types. Such an arrangement advantageously allows the intangible value of the cloud service to particular users to be captured in a particularly reliable manner. Workload migration decisions based on this intangible value of the cloud service to a particular user can then be made by the workload deployment module 116 in a manner that optimizes the utility of the cloud service for the particular user.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a Mesos framework or a Cloud Foundry Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system 112.

The processing platform 106 illustratively incorporates one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 6 and 7. A given such processing platform comprises at least one processing device comprising a processor coupled to a memory, and the processing device may be implemented at least in part utilizing one or more virtual machines or other virtualization infrastructure.

The operation of the information processing system 100 will now be described in further detail with reference to the flow diagram of FIG. 2. The process as shown includes steps 200 through 206, and is suitable for use in the system 100 but is more generally applicable to other systems comprising a processing platform having automated cloud service evaluation and workload migration functionality. Accordingly, references to components of the embodiment of FIG. 1 in the process description below should not be viewed as limiting in any way, as the disclosed process steps can be applied in a wide variety of other types of information processing systems.

In step 200, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 202, virtual resources of at least a first cloud-based system are implemented within the processing platform. For example, with reference to the FIG. 1 embodiment, virtual resources 110 of cloud-based system 112 are implemented within the processing platform 106. As mentioned previously, such virtual resources illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments.

In step 204, a value is assigned to a given cloud service provided by the first cloud-based system in terms of a virtual service unit or VSU standardized for use across multiple cloud-based systems of different types. The value assignment in the FIG. 1 embodiment is illustratively performed by the cloud service evaluation module 114.

As mentioned above, a particular customer, tenant or other user can specify the particular characteristics or other features of the cloud service that are to be converted into VSUs. Such an arrangement ensures that the value generated by the cloud service evaluation module 114 will reflect the intangible value of the cloud service based on subjective preferences of the particular user in a manner that facilitates accurate and meaningful comparison of such values across multiple clouds implemented by different cloud service providers.

Consider by way of example a cloud service that includes as a possible feature the support for a particular encryption service. Such a service may be very valuable to a user in a financial institution that relies on private transactions, but may be of little value to a user in an academic institution that generally publishes all of its output. A given user in illustrative embodiments can therefore select the particular subjectively-important features that are used to evaluate cloud services in terms of VSUs.

In step 206, migration of a workload associated with the cloud service from the first cloud-based system to a second cloud-based system is controlled based at least in part on the assigned value. The workload migration control based at least in part on the assigned value in the FIG. 1 embodiment is illustratively performed by the workload deployment module 116. It should be noted in this regard that the workload deployment module 116 can utilize the assigned value to determine an initial placement of the workload within a selected one of a plurality of cloud-based systems of the processing platform 106, in addition to or in place of utilizing the assigned value to control migration of the workload to another cloud-based system possibly on a different processing platform.

The term "migration" as used herein is intended to be broadly construed so as to encompass, for example, live migration of workloads as well as other types of migration of workloads, such as offline migration.

Figure 2:
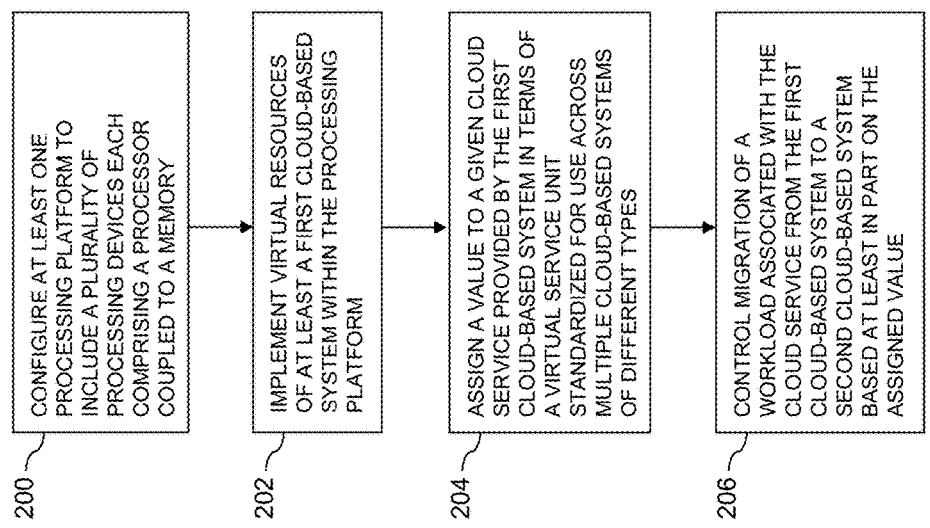
FIG. 2 is a flow diagram of an example process for automated cloud service evaluation and workload migration in an illustrative embodiment.

The FIG. 2 embodiment is advantageously configured to support live or offline migration of workloads from one cloud to another in a fully automated manner driven by cloud service evaluations in terms of standardized VSUs. A given customer, tenant or other user can specify the particular subjective parameters that are important to that user and those specified parameters can be used in generating the cloud service evaluations for multiple distinct clouds that have otherwise incompatible pricing arrangements.

The particular processing operations and other system functionality described in conjunction with the flow diagram of FIG. 2 are presented by way of illustrative example only, and should not be construed as limiting the scope of the invention in any way. Alternative embodiments can use other types of processing operations involving one or more processing platforms each configured with functionality for automated cloud service evaluation and workload migration. For example, the ordering of the process steps may be varied in other embodiments, or certain steps may be performed concurrently with one another rather than serially. Also, one or more of the process steps may be repeated periodically for different processing instances, or multiple such instances of the process may be performed at least in part in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments each implementing at least portions of the FIG. 2 process will now be described with reference to FIGS. 3, 4 and 5.

Figure 3:
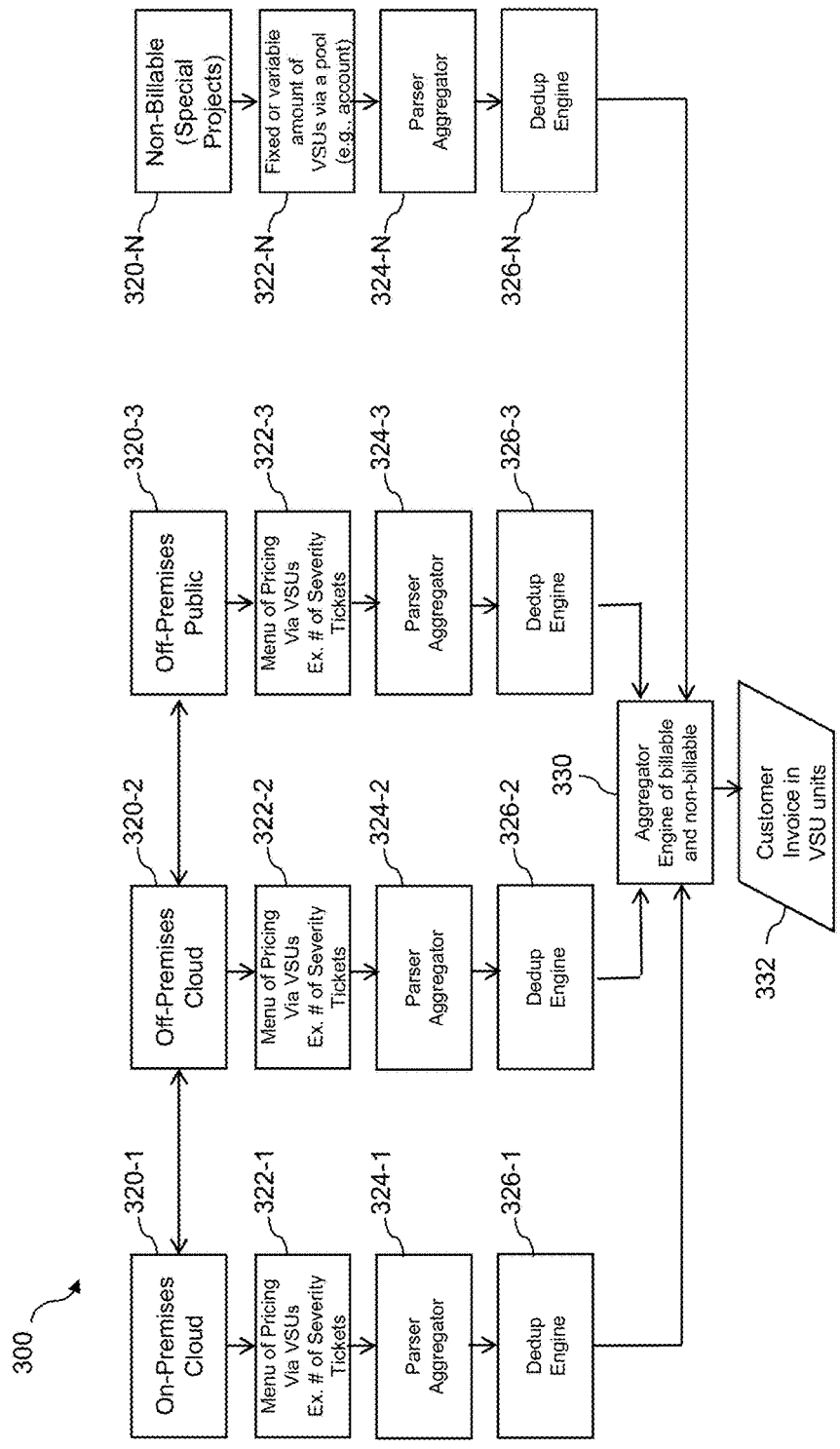
FIG. 3 shows another illustrative embodiment of an information processing system configured with automated cloud service evaluation and workload migration functionality.

Referring initially to FIG. 3, an information processing system 300 comprises at least one processing platform implementing a plurality of different cloud-based systems including an on-premises private cloud 320-1, an off-premises private cloud 320-2, an off-premises public cloud 320-3 and at least one additional cloud-based system, illustratively a cloud 320-N for implementing non-billable special projects.

Each of the cloud-based systems 320-1 through 320-N in the FIG. 3 embodiment has an associated cloud service evaluation module. The cloud service evaluation modules for respective ones of the cloud-based systems 320-1 through 320-N illustratively comprise respective ones of a plurality of conversion units 322-1 through 322-N, respective ones of a plurality of parsers and aggregators 324-1 through 324-N, and respective ones of a plurality of deduplication engines 326-1 through 326-N.

A given one of conversion units 322 is configured to determine numbers of VSUs associated with respective features of its corresponding cloud service. A given one of the parsers and aggregators 324 is configured to combine the numbers of VSUs determined by its corresponding one of the conversion units 322. A given one of the deduplication engines 326 is configured to remove any duplicative instances of the numbers of VSUs from its corresponding combined numbers of VSUs.

The system 300 further comprises a multi-cloud aggregation unit 330 configured to receive total numbers of VSUs for each of the cloud-based systems 320-1 through 320-N and to combine those total numbers into a multi-cloud value in terms of VSUs. The multi-cloud aggregation unit 330 in some embodiments is configured to generate a customer invoice 332 expressed in terms of VSUs, although other types of outputs can be generated in other embodiments, such as migration decisions or migration recommendations. Additional components associated with generation of such outputs are not explicitly shown.

The conversion units 322-1, 322-2 and 322-3 in this embodiment utilize respective pricing menus for use in converting particular features of a cloud service to particular numbers of VSUs. Examples of such conversion arrangements will be described in more detail below in conjunction with FIG. 5.

The conversion unit 322-N for the non-billable special projects cloud 320-N uses a fixed or variable amount of VSUs provided via a pool. For example, such an arrangement may correspond to a bank account or other type of account.

The parsers and aggregators 324 are each assumed to comprise separate parser and aggregator components. These components may be implemented, for example, as respective instances of a parser engine and an aggregator engine.

The parser is illustratively configured to capture feeds from respective VSU counters into a common file. These can be generated from various feeds such as event ticketing and notification systems, automatically generated threshold events and even manual counters such as time cards and time tracking for employees.

These events are then compared against a database of all VSU possibilities and only the options selected as billable or associated with a particular contract would then be collected and passed on to the aggregator.

In the parser, a severity level may also be assigned as metadata to the VSU, allowing further clarification during billable/non-billable processing.

The aggregator is illustratively configured to sort the VSUs received from the parser into various billing and chargeback groupings specific to each customer. For example, a particular business, organization or other entity may have its VSUs collected and other various subgroupings would also be aggregated. This sorting of VSUs facilitates proper accounting and further breakdowns of VSUs.

The deduplication engines 326 are configured to compare the VSUs received from their respective corresponding aggregators and to identify any discrepancies. For example, duplicate VSUs corresponding to the same event can be identified and replaced with a single instance for that event. Such duplicates can arise, for example, when a particular event is captured by an automated monitor and also captured manually by a technician.

The multi-cloud aggregation unit 330 is illustratively configured to identify billable and non-billable VSUs in order to create the customer invoice 332. For example, a given customer may have a plan that provides a threshold number of VSUs each month that are included with the plan, with additional VSUs over the threshold being billable at various rates. The metadata collected by the parsers can be used in this process.

An example implementation of the FIG. 3 arrangement in the context of generation of an invoice in terms of VSUs is as follows.

Assume that a customer has the following contract:

1. 2,000 anytime VSUs per month included in a base monthly charge of $30,000.
2. Severity 1 responses incur 3 VSUs per service hour of effort.
3. Severity 2 responses incur 2 VSUs per service hour of effort.
4. Severity 3 or 4 responses incur only 1 VSU per service hour of effort.

The parser performs the following operations:

1. Capture 200 VSUs for Severity 1 responses and attach customer metadata (customer A)
2. Capture 150 VSUs for Severity 2 responses and attach customer metadata (customer B)
3. Capture 500 VSUs for Severity 3 responses and attach customer metadata (customer C)
4. Capture 3000 VSUs for Severity 4 responses and attach customer metadata (customer A)
5. Additional capture of VSUs and attachment of customer metadata.

It is assumed that the above VSUs were captured over a specified billing invoice period, usually 30 days.

The aggregator would then sort these hundreds of VSUs and their associated metadata into the following list for invoicing customer A.

1. 200 VSUs attributed to Severity 1 responses.
2. 3000 VSUs attributed to Severity 3 responses.

The deduplication engine then operates as follows. Assume that the Severity 1 responses listed above automatically generated 100 Severity 1 tickets and 400 Severity 3 tickets that are marked non-billable because they are duplicated or because of a ripple effect. After deduplication, the billable VSUs are as follows:

1. 100 VSUs attributed to Severity 1 responses.
2. 2600 VSUs attributed to Severity 3 responses.

At this point, customer A has a contract that includes 2,000 VSUs as their base VSUs included within their monthly service charge. There are 700 VSUs remaining which are billed at different rates as follows:

1. 100 VSUs at $100 per VSU=$10,000 for the month
2. 600 VSUs at $10 per VSU=$6,000 for the month Base service charge=$30,000 for the month Total customer A invoice: $46,000 for the month In the foregoing example, the cloud service evaluation functionality of the FIG. 3 system is utilized in generating customer invoices. As noted previously, such cloud service evaluation functionality can additionally be utilized to drive migration decisions or associated migration recommendations for various customers or other users.

Another illustrative embodiment more particularly illustrating the migration functionality is shown in FIG. 4. This figure shows an information processing system 400 in which a given workload 405 can be executed on a number of different cloud-based systems, including an on-premises private cloud 420-1, an off-premises private cloud 420-2, and an off-premises public cloud 420-3. These clouds are assumed to comprise respective cloud-based systems implemented on one or more distinct processing platforms.

The clouds 420-1, 420-2 and 420-3 generate respective distinct VSU-based monthly invoices 440-1, 440-2 and 440-3 in executing the workload as a cloud service, based on the respective distinct contracts 442-1, 442-2 and 442-3, each of which includes different billing parameters and fees as shown. Each of the invoices 440 may be generated using techniques similar to those described above in conjunction with the embodiment of FIG. 3.

It is assumed that the different clouds 420 in this embodiment are associated with respective different cloud service providers, each providing cloud services in accordance with a different one of the contracts 442. Such considerable differences between the various types of contracts in conventional practice would greatly inhibit the movement of the workload 405 between the different clouds 420. For example, a given customer would be unable to easily compare the subjective or intangible value to that customer of executing the workload in a particular one of the clouds. However, in the present embodiment, in which the cloud services provided by each of the clouds 420 are characterized by values expressed in terms of standardized VSUs, the comparison can be done easily and accurately, and can be used to drive automated migration decisions as well as other automated functionality such as performance of business analytics for the customer. Such an approach advantageously prevents a cloud service provider from holding a given workload "hostage" by making it difficult for the customer to determine whether it should be migrated elsewhere. The use of automated cloud service evaluation based on VSUs as disclosed herein makes such workload migration decisions highly efficient and easily implemented.

Figure 4A:
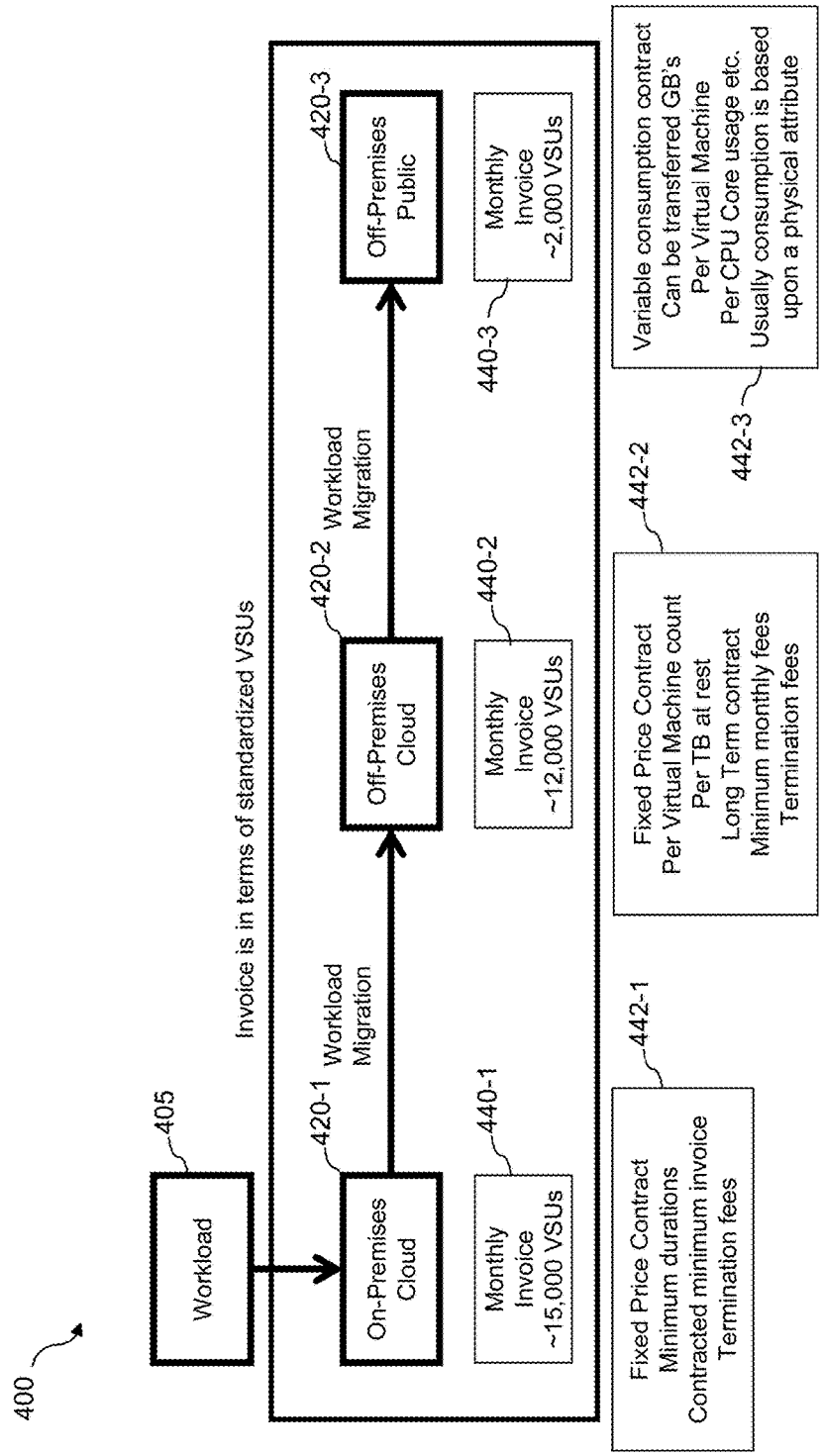
FIGS. 4A through 4C show examples of workload migration based on automated cloud service evaluation in another illustrative embodiment. These figures are collectively referred to herein as FIG. 4.

FIG. 4A illustrates the workload 405 running on the on-premises cloud 420-1. It is assumed that the corresponding cloud service is characterized in terms of VSUs by monthly invoice 440-1 computed in accordance with contract 442-1. The invoices 440 in VSUs can be used to drive migration decisions, such as a decision to migrate the workload 405 from the on-premises private cloud 420-1 to one of the other clouds 420-2 or 420-3. As the monthly invoices for implementing the cloud service of executing the workload 405 are all specified in terms of VSUs, the relative advantages of migrating the workload 405 to one of the other clouds 420-2 or 420-3 can be readily determined. Such migration analysis and decisions can be implemented by a workload deployment module of a given processing platform, or by multiple such modules running on different platforms.

Figure 4B:
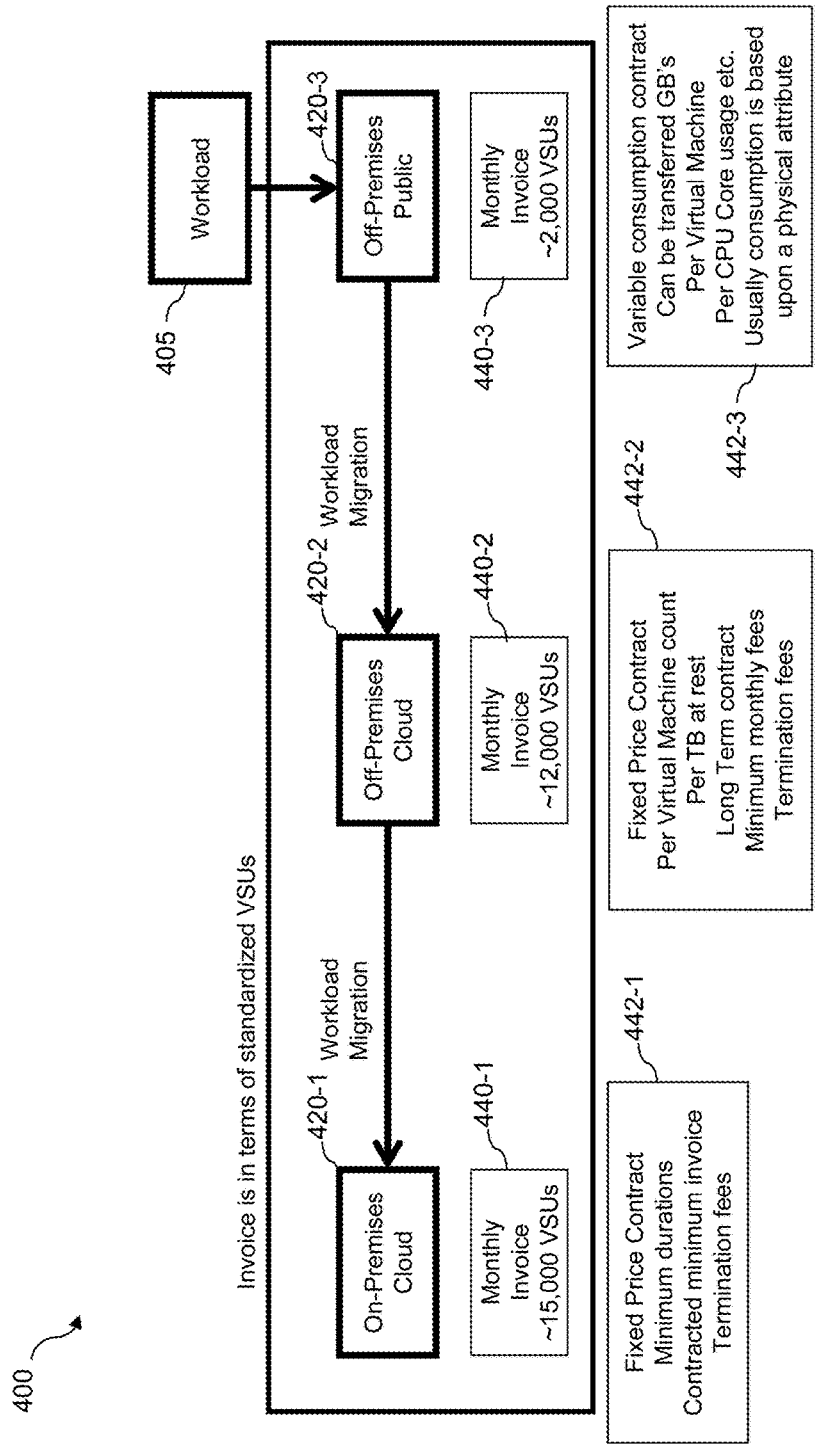
Figure 4C:
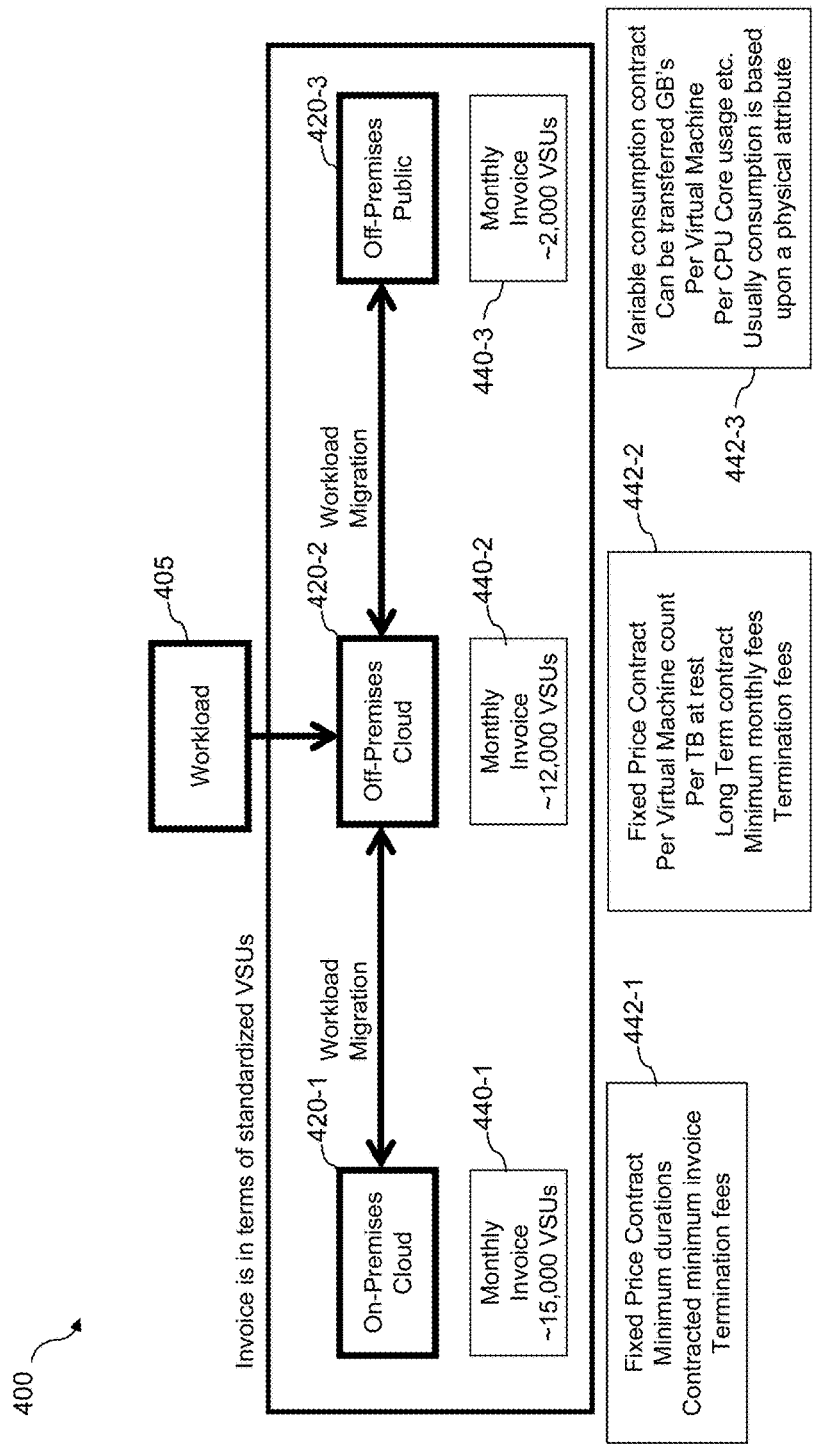

Additional migration possibilities for the workload 405 are illustrated in FIGS. 4B and 4C. For example, if the workload is migrated to the off-premises public cloud 420-3 as shown in FIG. 4B, it can subsequently be migrated to the off-premises private cloud 420-2 or even back to the on-premises private cloud 420-1. Similarly, if the workload is migrated to the off-premises private cloud 420-2 as shown in FIG. 4C, it can subsequently be migrated to the off-premises public cloud 420-3 or even back to the on-premises private cloud 420-1. The migration decisions are illustratively done automatically under the control of one or more instances of the workload deployment module associated with one or more of the cloud-based systems 420, based at least in part on values expressed in terms of VSUs and determined by one or more cloud service evaluation modules.

Referring now to FIG. 5, examples of cloud service evaluation utilizing standardized VSUs are shown. In this embodiment, a conversion unit of a cloud service evaluation module is assumed to comprise a plurality of tables 500 suitable for use in converting various cloud service characteristics or other features into standardized VSUs. The tables 500 include tables 502 through 518 arranged in FIGS. 5A, 5B, 5C and 5D.

Figure 5A:
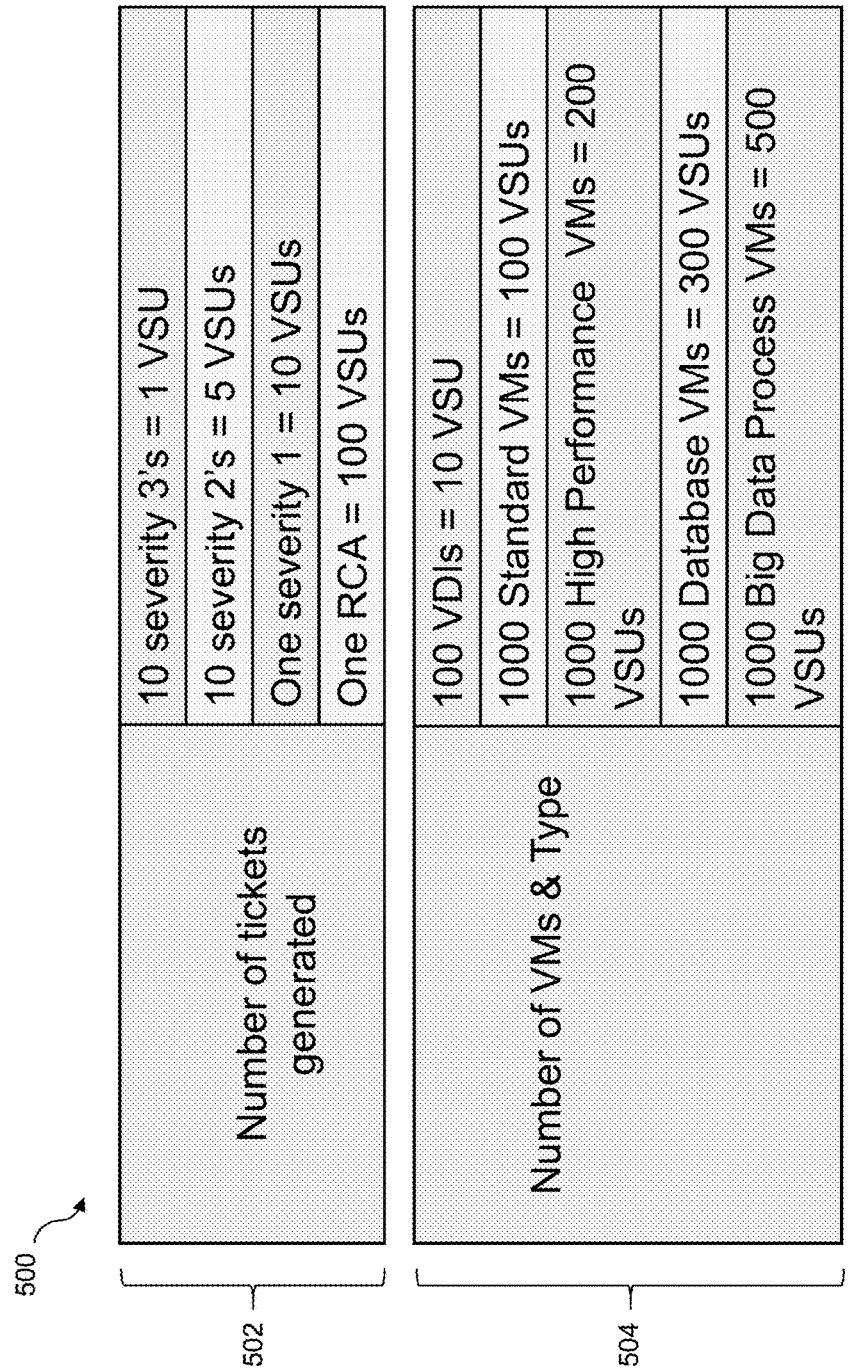
FIGS. 5A through 5D show examples of cloud service evaluation utilizing standardized virtual service units. These figures are collectively referred to herein as FIG. 5.

FIG. 5A shows tables 502 and 504. Table 502 is configured to convert a number and type of tickets generated into a number of VSUs, and table 504 is configured to convert a number and type of virtual machines into a number of VSUs. In this figure, RCA denotes "root cause analysis" and VDI denotes "virtual desktop infrastructure."

Figure 5B:
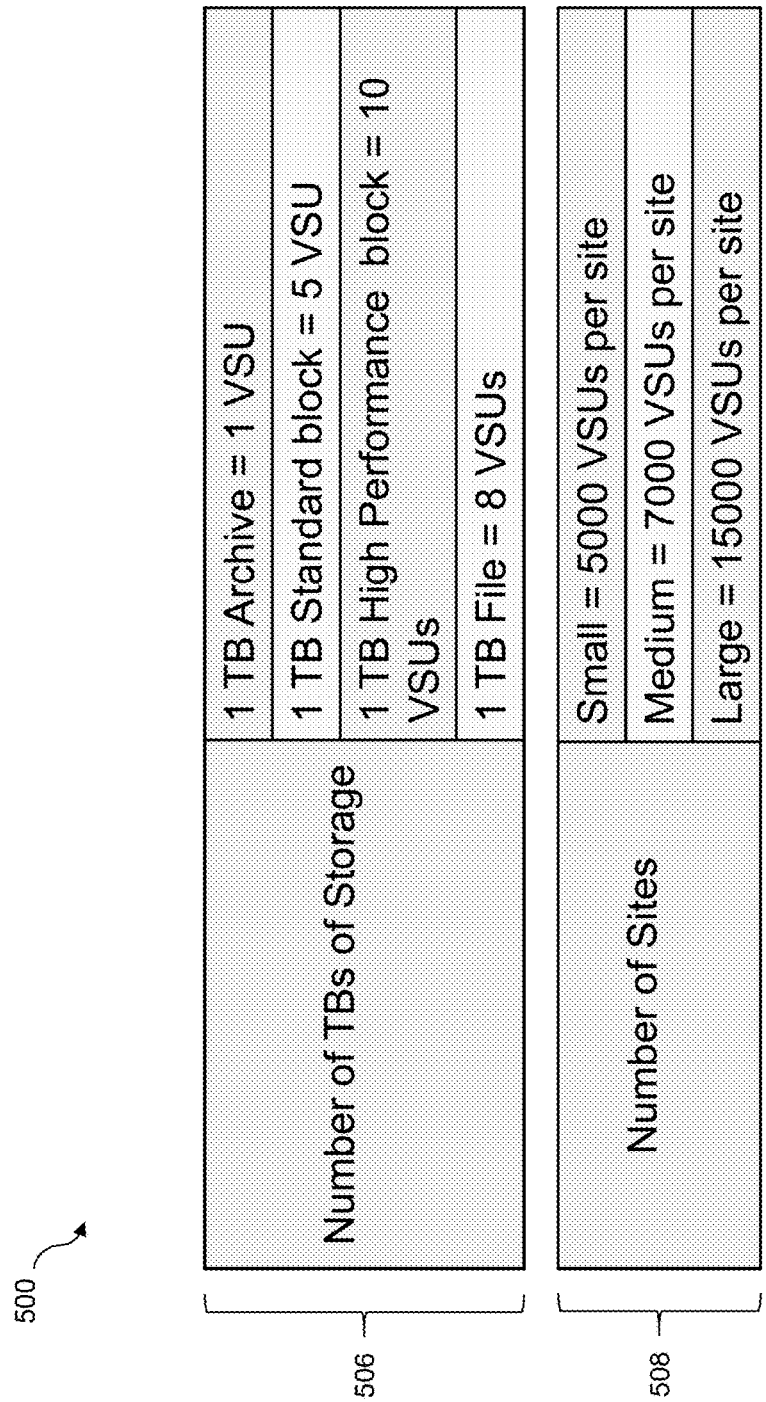

FIG. 5B shows tables 506 and 508. Table 506 is configured to convert a number and type of storage resources into a number of VSUs, and table 508 is configured to convert a number and type of sites into a number of VSUs.

Figure 5C:
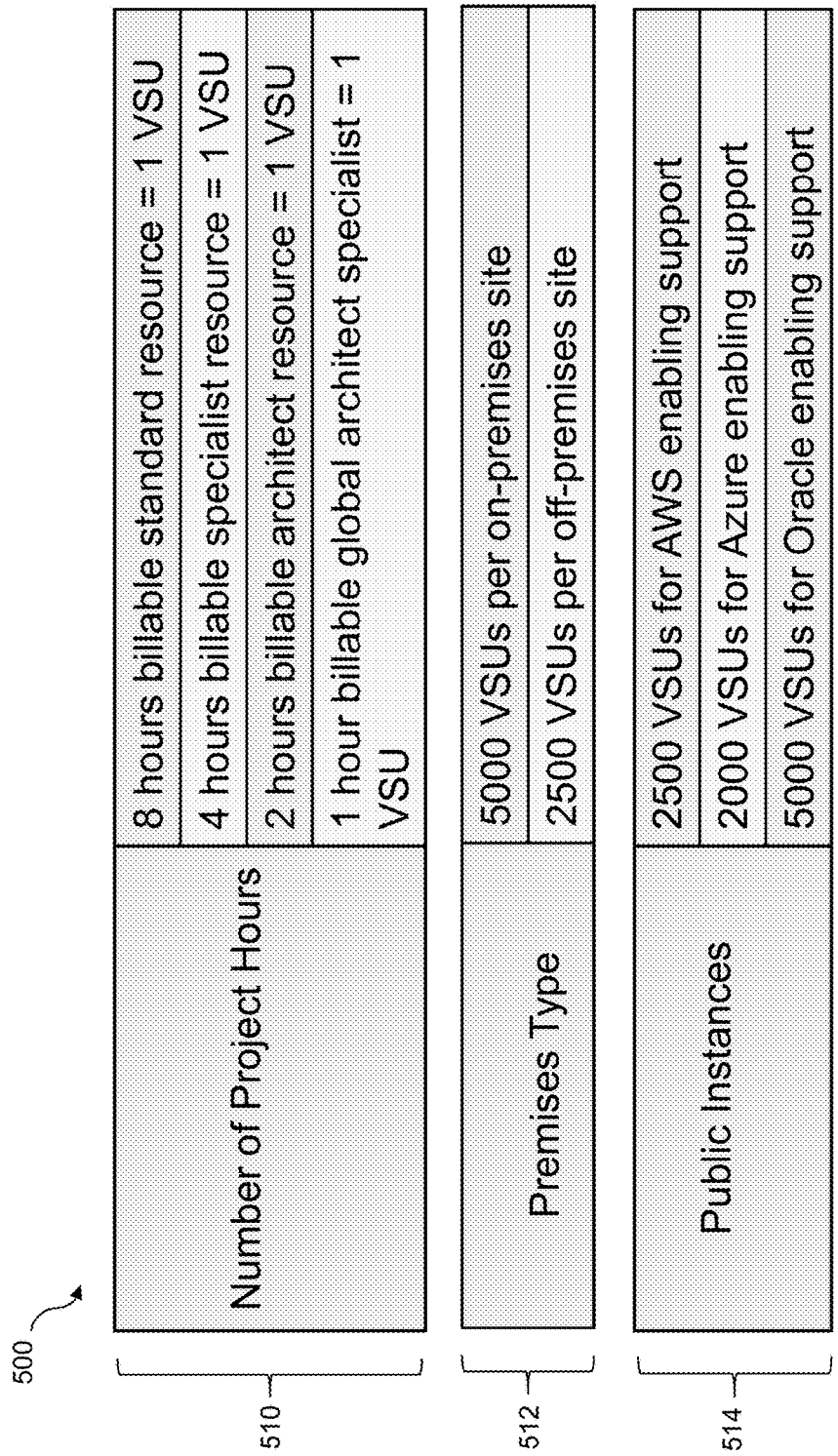

FIG. 5C shows tables 510, 512 and 514. Table 510 is configured to convert a number and type of project hours into a number of VSUs, table 512 is configured to convert a types of premises into a number of VSUs, and table 514 is configured to convert a number and type of public instances into a number of VSUs.

Figure 5D:
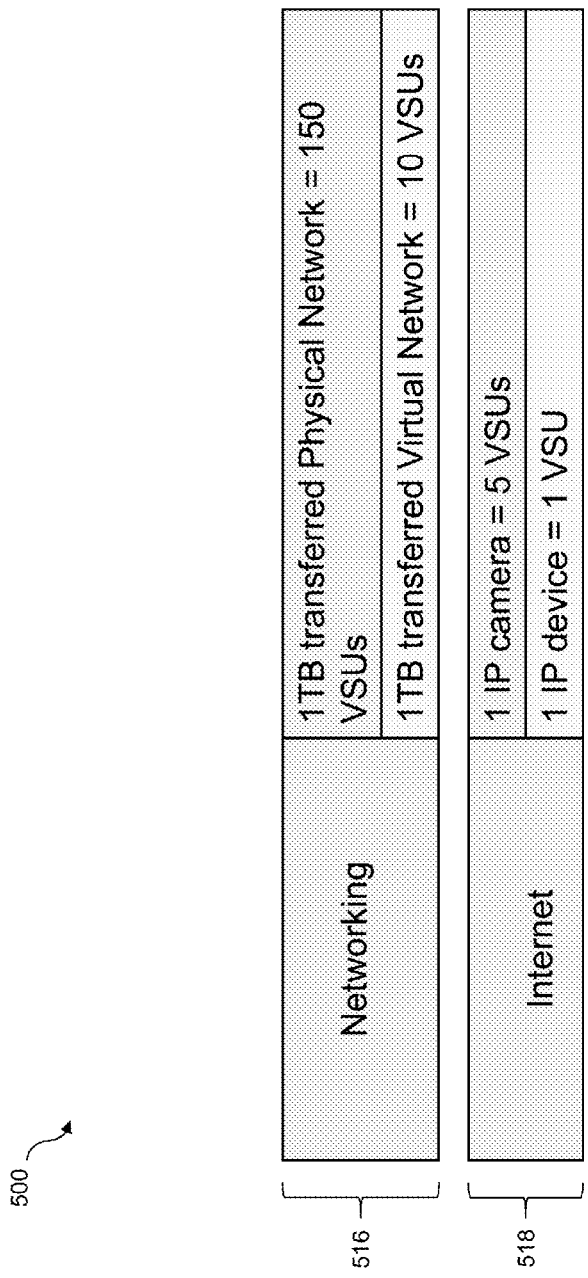

FIG. 5D shows tables 516 and 518. Table 516 is configured to convert a number and type of network resources into a number of VSUs, and table 518 is configured to convert a number and type of Internet devices into a number of VSUs.

It should be understood that the particular conversion examples illustrated in the tables 500 of FIG. 5 are presented by way of example only, and numerous other characteristics or other features of cloud services can be converted to VSUs using alternative tables or other types of conversion mechanisms. Other examples include features associated with service management, service delivery and contract flexibility.

Illustrative embodiments can provide considerable advantages over conventional cloud service arrangements.

For example, challenges associated with evaluation of cloud services implemented on different clouds are overcome through the use of standardized VSUs. Such automated evaluation facilitates efficient deployment and migration of workloads across multiple distinct private, public or hybrid clouds, providing substantial cost and performance advantages for users.

Automated cloud service valuation using standardized VSUs in some embodiments allows customers, tenants and other users to quickly and efficiently determine the intangible and subjective value of their cloud services within different cloud-based systems that utilize otherwise incompatible pricing arrangements. The VSUs provide a well-defined standardized methodology for permitting such cloud service evaluation. Particular features that are important to a given user can be specified by that user and utilized by the system in generating the corresponding cloud service evaluations in terms of VSUs. In this manner, the particular features preferred by a given user can be captured and utilized to compare cloud service implementations across multiple unrelated clouds from different cloud service providers.

These and other embodiments can be configured to allow the user to determine the manner in which the cloud services will be evaluated for that user across multiple clouds by specifying the particular features to be converted into VSUs and possible also other parameters such as conversion rates.

This provides substantial improvements relative to arrangements in which, for example, individual cloud service providers each separately score or rate their own cloud services in a manner that is often incompatible with the scores or ratings generated by other cloud service providers.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention, such as portions of the information processing systems 300 and 400 of respective FIGS. 3 and 4.

Figure 6:
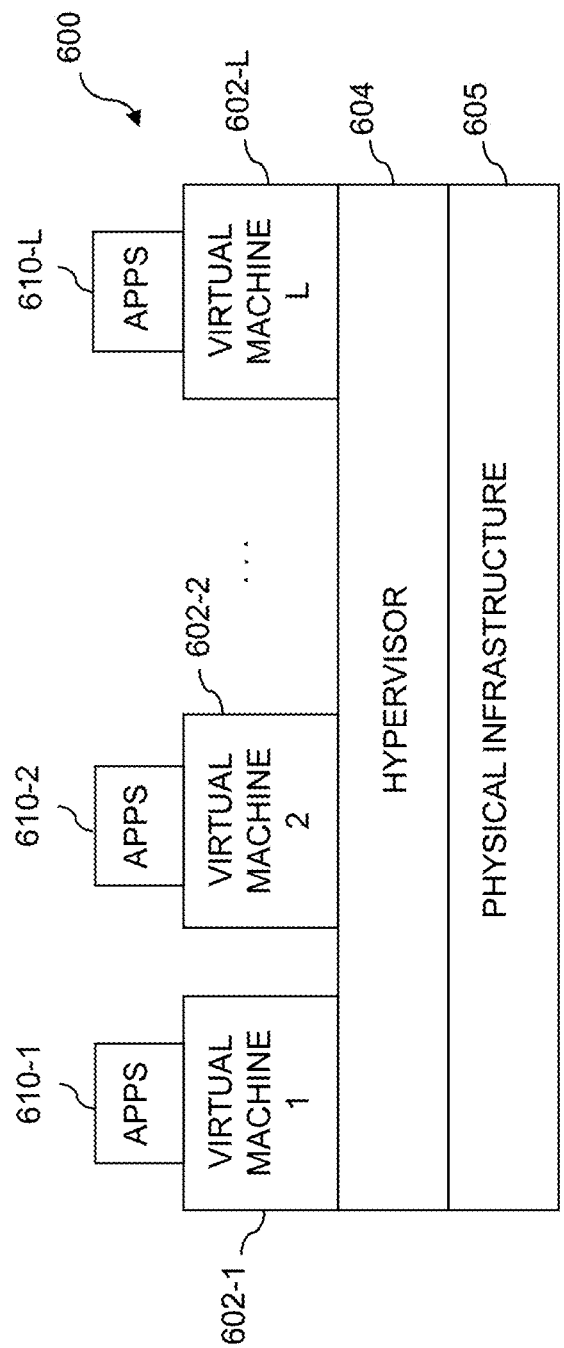
FIGS. 6 and 7 show examples of processing platforms that may be utilized to implement at least a portion of a given one of the information processing systems of FIGS. 1, 3 and 4.
Figure 7:
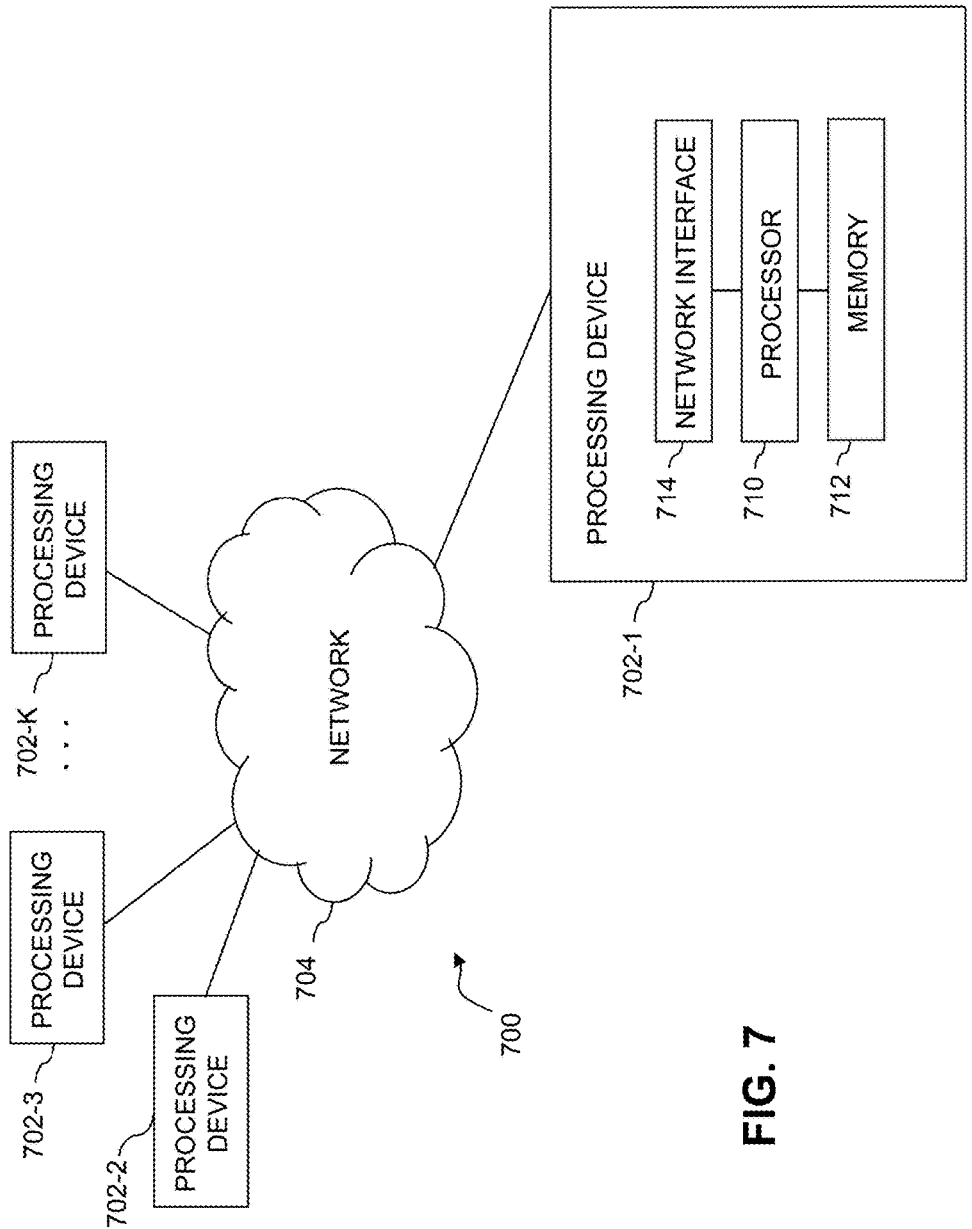

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the information processing system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VIMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an ASIC, a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide the above-noted Docker containers or other types of LXCs.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to provide accurate and efficient cloud service evaluation and workload migration. Also, the particular configurations of system and device elements shown in the figures can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as examples rather than as requirements or limitations of the invention. Numerous other alternative embodiments within the scope of the appended claims will be readily apparent to those skilled in the art.

What is claimed is:

1. An apparatus comprising:
   at least one processing platform comprising a plurality of processing devices each comprising a processor coupled to a memory;
   the at least one processing platform being configured to implement virtual resources of at least a first cloud-based system;
   wherein the at least one processing platform further comprises:
   a cloud service evaluation module configured to assign a value to a given cloud service provided by the first cloud-based system in terms of a virtual service unit standardized for use across multiple cloud-based systems of different types; and
   a workload deployment module configured to control migration of a workload associated with the given cloud service from the first cloud-based system to a second cloud-based system based at least in part on the assigned value;
   wherein assigning the value to the given cloud service provided by the first cloud-based system comprises:
   converting a first set of one or more cloud service features into a first number of virtual service units, the first set of one or more cloud service features comprising at least one of number and type of processor resources, number and type of storage resources, and number and type of network resources;
   converting a second set of one or more cloud service features different than the first set of one or more cloud service features into a second number of virtual service units, the second set of one or more cloud service features comprising one or more additional cloud service features other than number and type of processor resources, number and type of storage resources, and number and type of network resources; and
   aggregating the first and second numbers of virtual service units;
   wherein the workload associated with the given cloud service is migrated from the first cloud-based system to the second cloud-based system based at least in part on the aggregated first and second numbers of virtual service units.

2. The apparatus of claim 1 wherein the workload deployment module is configured to control migration of the workload between an on-premises private cloud and at least one of an off-premises private cloud and an off-premises public cloud.

3. The apparatus of claim 1 wherein the workload deployment module is configured to control migration of the workload from an off-premises private cloud and at least one of an on-premises private cloud and an off-premises public cloud.

4. The apparatus of claim 1 wherein the workload deployment module is configured to control migration of the workload from an off-premises public cloud and at least one of an on-premises private cloud and an off-premises private cloud.

5. The apparatus of claim 1 wherein the value assigned to the given cloud service by the cloud service evaluation module comprises a particular number of virtual service units.

6. The apparatus of claim 1 wherein the first and second cloud-based systems utilize different types of contracts to characterize costs associated with provisioning of the given cloud service within those systems and the assigned value allows the cost associated with provisioning of the given cloud service in the first cloud-based system to be compared against a corresponding assigned value indicative of the cost associated with provisioning of the given cloud service in the second cloud-based system.

7. The apparatus of claim 1 wherein the cloud service evaluation module is configured to assign the value to the given cloud service provided by the first cloud-based system utilizing one or more of the following:
   converting at least one of a number and type of tickets generated into a number of virtual service units;
   converting at least one of a number and type of virtual machines into a number of virtual service units;
   converting at least one of a number and type of storage resources into a number of virtual service units;
   converting at least one of a number and type of sites into a number of virtual service units;
   converting at least one of a number and type of project hours into a number of virtual service units;
   converting at least one of a number and type of public instances into a number of virtual service units;
   converting at least one of a number and type of network resources into a number of virtual service units; and
   converting at least one of a number and type of Internet devices into a number of virtual service units.

8. The apparatus of claim 7 wherein the cloud service evaluation module is configured to aggregate the numbers of virtual service units resulting from respective ones of the converting operations in conjunction with assigning the value to the given cloud service provided by the first cloud-based system.

9. The apparatus of claim 1 wherein the cloud service evaluation module further comprises:
   a conversion unit configured to determine numbers of virtual service units associated with respective features of the given cloud service;

a parser and aggregator configured to combine the numbers of virtual service units determined by the conversion unit; and a deduplication engine configured to remove any duplicative instances of the numbers of virtual service units from the combined numbers of virtual service units.

10. The apparatus of claim 9 wherein the cloud service evaluation module further comprises one or more additional sets of instances of the conversion unit, the parser and aggregator and the deduplication engine for respective ones of one or more additional projects associated with the given cloud service.

11. The apparatus of claim 9 wherein the cloud service evaluation module further comprises a multi-cloud aggregation unit configured to receive total numbers of virtual service units for each of a plurality of cloud-based systems and to combine those total numbers into a multi-cloud value in terms of virtual service units.

12. The apparatus of claim 1 wherein the virtual resources comprises at least one of a plurality of virtual machines and a plurality of containers configured to run on at least a subset of the virtual machines.

13. An information processing system comprising the apparatus of claim 1.

14. A method comprising:
assigning a value to a given cloud service provided by a first cloud-based system in terms of a virtual service unit standardized for use across multiple cloud-based systems of different types; and
controlling migration of a workload associated with the given cloud service from the first cloud-based system to a second cloud-based system based at least in part on the assigned value;
wherein assigning the value to the given cloud service provided by the first cloud-based system comprises:
converting a first set of one or more cloud service features into a first number of virtual service units, the first set of one or more cloud service features comprising at least one of number and type of processor resources, number and type of storage resources, and number and type of network resources;
converting a second set of one or more cloud service features different than the first set of one or more cloud service features into a second number of virtual service units, the second set of one or more cloud service features comprising one or more additional cloud service features other than number and type of processor resources, number and type of storage resources, and number and type of network resources; and
aggregating the first and second numbers of virtual service units;
wherein the workload associated with the given cloud service is migrated from the first cloud-based system to the second cloud-based system based at least in part on the aggregated first and second numbers of virtual service units;
wherein the assigning and controlling are implemented in at least one processing platform configured to include a plurality of processing devices each comprising a processor coupled to a memory; and
wherein the processing platform is configured to implement virtual resources of at least the first cloud-based system.

15. The method of claim 14 wherein the value assigned to the given cloud service comprises a particular number of virtual service units.

16. The method of claim 14 wherein assigning the value to the given cloud service provided by the first cloud-based system comprises one or more of the following:
converting at least one of a number and type of tickets generated into a number of virtual service units;
converting at least one of a number and type of virtual machines into a number of virtual service units;
converting at least one of a number and type of storage resources into a number of virtual service units;
converting at least one of a number and type of sites into a number of virtual service units;
converting at least one of a number and type of project hours into a number of virtual service units;
converting at least one of a number and type of public instances into a number of virtual service units;
converting at least one of a number and type of network resources into a number of virtual service units; and
converting at least one of a number and type of Internet devices into a number of virtual service units.

17. The method of claim 16 further comprising aggregating the numbers of virtual service units resulting from respective ones of the converting operations in conjunction with assigning the value to the given cloud service provided by the first cloud-based system.

18. A computer program product comprising a non-transitory processor-readable storage medium having stored therein program code of one or more software programs, wherein the program code when executed by a processing platform comprising a plurality of processing devices causes the processing platform:
to assign a value to a given cloud service provided by a first cloud-based system in terms of a virtual service unit standardized for use across multiple cloud-based systems of different types; and
to control migration of a workload associated with the given cloud service from the first cloud-based system to a second cloud-based system based at least in part on the assigned value;
wherein assigning the value to the given cloud service provided by the first cloud-based system comprises:
converting a first set of one or more cloud service features into a first number of virtual service units, the first set of one or more cloud service features comprising at least one of number and type of processor resources, number and type of storage resources, and number and type of network resources;
converting a second set of one or more cloud service features different than the first set of one or more cloud service features into a second number of virtual service units, the second set of one or more cloud service features comprising one or more additional cloud service features other than number and type of processor resources, number and type of storage resources, and number and type of network resources; and
aggregating the first and second numbers of virtual service units;
wherein the workload associated with the given cloud service is migrated from the first cloud-based system to the second cloud-based system based at least in part on the aggregated first and second numbers of virtual service units;
wherein the processing platform is configured to implement virtual resources of at least the first cloud-based system.

19. The computer program product of claim 18 wherein the value assigned to the given cloud service comprises a particular number of virtual service units.

20. The computer program product of claim 18 wherein assigning the value to the given cloud service provided by the first cloud-based system comprises one or more of the following:
   converting at least one of a number and type of tickets generated into a number of virtual service units;
   converting at least one of a number and type of virtual machines into a number of virtual service units;
   converting at least one of a number and type of storage resources into a number of virtual service units;
   converting at least one of a number and type of sites into a number of virtual service units;
   converting at least one of a number and type of project hours into a number of virtual service units;
   converting at least one of a number and type of public instances into a number of virtual service units;
   converting at least one of a number and type of network resources into a number of virtual service units; and
   converting at least one of a number and type of Internet devices into a number of virtual service units.

* * * * *